United States Patent Office 3,296,301
Patented Jan. 3, 1967

3,296,301
NITROGENOUS ORGANIC COMPOUNDS OF PHOSPHORUS
Morris L. Nielsen, Dayton, Ohio, assignor to Monsanto Research Corporation, St. Louis, Mo., a corporation of Delaware
No Drawing. Filed July 29, 1963, Ser. No. 298,421
10 Claims. (Cl. 260—500)

This invention relates to nitrogenous organic compounds of phosphorus and more particularly provides a new and valuable class of N-substituted phosphonamidic acids.

According to the invention there are provided N-(aminoakyly) or N-(aminohydroxyalkyl)hydrocarbylphosphonamidic acids where the hydrocarbyl radical is aromatic, by the condensation of an aromatic hydrocarbylphosphonic dihalide with an alkylenediamine or a diaminoalkanol in the presence of an aqueous base, substantially according to the scheme:

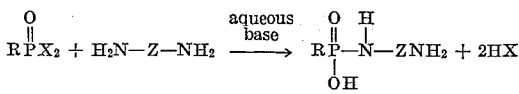

where R is an aromatic hydrocarbon radical which is free of olefinic and acetylenic unsaturation and contains from 6 to 12 carbon atoms and Z is selected from the class consisting of alkylene and hydroxyalkylene having a total of 2 to 10 carbon atoms and 2 to 6 carbon atoms in the alkylene chain to which the nitrogen atoms are attached at diverse carbon atoms of the chain, (i.e. the nitrogen atoms are separated by a chain of 2 to 6 carbon atoms) and X is halogen having an atomic weight of at least 35.

Useful phosphonic dihalides include, e.g., phenylphosphonic dichloride, dibromide or diiodide, o-, m- or p-tolylphosphonic dichloride or dibromide, pentamethylphenylphosphonic dichloride or diiodide, o-, m- or p-tert-butylphenylphosphonic dichloride or dibromide, o-, m- or p-hexylphenylphosphonic dichloride or dibromide, o-, m- or p-biphenylylphosphonic dichloride or dibromide, α- or β-naphthylphosphonic dichloride or diiodide, o-, m- or p-cyclohexylphenylosophonic dichloride or dibromide, o-, m- or p-cyclopropylphenylphosphonic dibromide or diiodide, 1- or 3-acenaphthenylphosphonic dichloride or dibromide, etc.

The diamino compounds which react with said phosphonic dihalides to give the presently provided phosphonamidic acids include the alkylene diamines such as ethylenediamine, 1,3-propanediamine, 1,2-propanediamine, 1,-4-butanediamine, 1,3-butanediamine, 1,5-pentanediamine, 1,6-hexanediamine, 2,5-dimethyl-2,5-hexanediamine, 3-ethyl-1,5-pentanediamine, or 4-butyl-1,6-hexanediamine; and the diamino alkanols such as 1,4-diamino-3-butanol, 1,3-diamino-2-propanol, 1,5-diamino-3-pentanol, 1,5-diamino-2-pentanol, 1,6-diamino-2-hexanol, 2,5-diamino-2,5-dimethyl-3-pentanol, 2,6-diamino-2,6-dimethyl-4-heptanol, etc.

The presently provided N-(aminoalkyl)-P-hydrocarbylphosphonamidic acids are obtained by reaction of an aromatic hydrocarbylphosphonic dihalide with an alkylenediamine in presence of water. Thus, reaction of phenylphosphonic dichloride, dibromide or diiodide with ethylenediamine yields N-(2-aminoethyl)-P-phenylphosphonamidic acid and when the diamine is 2-methyl-1,3-propanediamine the product is N-(3-amino-2-methylpropyl)-P-phenylphosphonamidic acid. Similarly, o-, m- or p-tolylphosphonic dichloride or dibromide and 1,4-butanediamine yield N-(4-amino-butyl)-P-(o-, m- or p-tolyl)phosphonamidic acid; (o-, m- or p-ethyl or butylphenyl)phosphonic dichloride or diiodide reacts with 2,5-dimethyl-2,5-hexanediamine to give N-(4-amino-1-methylpentyl)-P-(o-, m- or p-ethyl- or butylphenyl)phosphonamidic acid; p-cyclohexylphenylphosphonic dibromide reacts with 4-butyl-1,6-hexanediamine to give N-(6-amino-4-butyl)-P-(p-cyclohexylphenyl)phosphonamidic acid; α- or β-naphthylphosphonic dichloride reacts with 1,3-propanediamine to give N-(3-aminopropyl)-P-α- or β-naphthylphosphonamidic acid, o-, m- or p-biphenylyphosphonic dichloride reacts with 1,5-pentanediamine to give N-(5-aminopentyl)-P-o-, m- or p-biphenylylphosphonamidic acid, etc. All such products have the structure

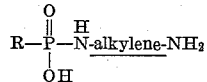

where R is the aromatic hydrocarbon radical defined above and alkylene denotes an alkylene radical having a total of 2 to 10 carbon atoms and 2 to 6 carbon atoms in the alkylene chain to which the nitrogen atoms are attached at diverse carbon atoms of the chain.

When employing a diaminoalkanol instead of an alkylenediamine, the products are N-(aminohydroxyalkyl)-P-hydrocarbylphosphonamidic acids of the structure

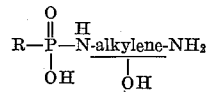

where R and alkylene are as defined above and the —OH radical is attached to a carbon atom of the alkylene chain. Thus, reaction of phenylphosphonic dichloride, dibromide or diiodide and 1,5-diamino-3-pentanol gives N-(5-amino-3-hydroxypentyl)-P-phenylphosphonamidic acid; reaction of p-hexylphenylphosphonic dichloride or dibromide and 1,3 - diamino - 2 - propanol gives N - (3 - amino - 2-hydroxypropyl) - P - (p - hexylphenyl)phosphonamidic acid; reaction of 2,6-diamino-2,6-dimethyl-4-heptanol with 1-acenaphthenylphosphonic dibromide yields N-(5-amino-1,5 - dimethyl - 3 - hydroxyhexyl) - P - (1 - acenaphthenyl)phosphonamidic acid; and reaction of 1,3-diamino-2-propanol and p-ethylphenylphosphonic dichloride gives N - (3 - amino - 2 - hydroxypropyl - P - (p - ethylphenyl) phosphonamidic acid.

Reaction of the aromatic hydrocarbonphosphonic dihalide with the diamino compound to give the presently provided N-substituted phosphonamidic acids may be conducted by simply mixing the two reactants in the presence of water and a basic agent and allowing the mixture to stand until formation of said phosphonamidic compound is completed. The reaction is usually exothermic; hence, heating is not generally required. However, when working with the somewhat sluggish higher hydrocarbonphosphonic dihalides, e.g., the biphenylylphosphonic dichlorides or the pentylphenylphosphonic dibromides, or with the higher alkenediamines or diaminopropanols such as 1,6-hexanediamine or 1,5-diamino-1,5-diethyl-3-hydroxypentanol, heating may be used for the purpose of decreasing reaction time. Temperatures of from, say 60° C. to 150° C., are thus useful.

The present N-(aminoalkyl)- or N-(aminohydroxyalkyl)hydrocarbylphosphonamidic acids are water-soluble. To remove any unreacted organic starting material from the reaction mixture, the latter may be distilled off; or, more conveniently, such starting material may be extracted with an organic solvent, e.g., chloroform, benzene, xylene, carbon tetrachloride, etc. The condensation reaction may be effected in the presence of such solvent, whereby the desired product, i.e., the phosphonamidic acid compound is obtained by simply recovering the aqueous layer after stratification.

The basic agent, which serves not only to catalyze the reaction but may also serve as hydrogen halide scavenger, may be organic or inorganic, e.g., an alkali metal hydroxide or basic salt thereof such as sodium, potassium, lithium or rubidium hydroxide, carbonate or acetate; an alkali metal alkoxide such as sodium or potassium methoxide or propoxide; a tertiary alkylamine such as trimethylamine or tributylamine; a heterocyclic nitrogen base such as N-methylmorpholine or pyridine; a quaternary ammonium compound such as benzyltrimethylammonium methoxide or tetrabutylammonium butoxide, etc. A water-soluble, inorganic base is preferred. Water participates in the reaction. Hence, if the basic agent is water-insoluble, water must be present together with a solvent for the base if such solvent is used.

Since reaction occurs with evolution of hydrogen halide, it is advisable to make provision for removal of the halide as it is formed, e.g., by means of vigorous stirring and/or dephlegmation and/or by employing the basic material in an amount sufficient to serve as a halide scavenger, whereby the hydrogen halide which is formed is removed from the reaction zone as the halide of the base.

All of the reaction variables, i.e., nature of diluent, basic agent, temperature, pressure, etc., can be arrived at readily by easy experimentation. Since reaction is evidenced by change in viscosity and evolution of hydrogen halide, progress of the reaction can be followed by noting these.

One mole of the alkylenediamine or diaminoalkanol reacts with one mole of the hydrocarbylphosphonic dihalide to yield the present N-substituted aromatic hydrocarbylphosphonamidic acids; hence, the two reactants are advantageously employed in such stoichiometric proportions. However, a slight excess of the phosphonic dihalide is useful in that thereby formation of a diamine is discouraged. As disclosed above, the phosphonamidic acid compound is readily separated from any excess reactant. Preferably the quantity of basic agent which is used is sufficient to effect removal of the by-product hydrogen halide which results from the condensation reaction, and also to effect hydrolysis of residual acyl halogen to free acid. For that reason, in order to obtain optimum yields of the desired product, about two moles of base per mole of the phosphonic dihalide is advantageously employed.

The presently provided N-(aminoalkyl)- and N-(aminohydroxyalkyl)- aromatic P - hydrocarbylphosphonamidic acids are stable, well-defined compounds which are generally high-melting crystalline solids. Because they possess more than one functional group, they are particularly valuable as starting materials for the production of high-molecular weight polymers. The two reactive groups of the N-(aminoalkyl) compounds, i.e., the terminal amino group of the N-substituent and the P-hydroxy group make these compounds suitable for conversion to linear polymers by reaction with, e.g., dihalides, thus

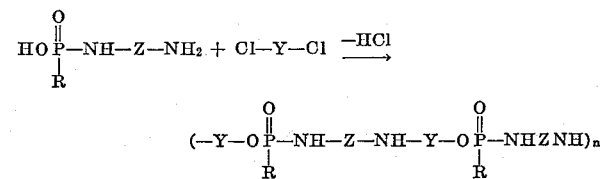

wherein Y is an alkylene radical of from, say, 2 to 8 carbon atoms and R and Z are as above defined.

Dihalides which are useful in the above reaction are alkylene or alkyleneoxyalkylene dichlorides, dibromides or diiodides such as 1,3-dichloropropane or bis(2-chloroethoxyethyl) ether. Also useful as reactants for conversion of the present N-(aminoalkyl)hydrocarbylphosphonamidic acids into linear polymers are compounds having two olefinic or acetylenic groups which are known to react with hydroxy or amino compounds by addition across the unsaturated bond, for example, the diacrylates such as ethylene glycol diacrylate. One mole of the diacrylate combines with one mole of the N-(aminoalkyl)-P-hydrocarbylphosphonamidic acid to give a linear polymer having alternating carboxylate and phosphonamide linkages. Thus, the diacrylate of 2,2-dimethyl-1,3-propanediol reacts with N-(3-aminopropyl)-P-p-tolylphosphonamidic acid to give a linear polymer having the repeating unit

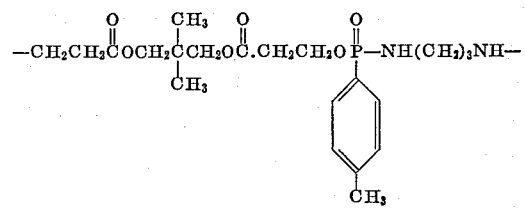

The linear condensation polymers formed by reaction of the present N-(aminoalkyl)hydrocarbylphosphonamidic acids with alkylene dihalides or by the addition polymerization of diacrylates with said phosphonamidic acids are characterized by very good thermal resistance and solutions thereof are eminently suited for use as coatings in applications where high resistance to heat is required. The polymers may also be molded under heat and pressure to give well-dimensioned molded pieces, or they may be used as adhesives or impregnants in the production of laminates.

Owing to the fact that the present N-(aminohydroxyalkyl)-P-hydrocarbylphosphonamidic acids have three reactive groups, i.e., the terminal amino group, the P-hydroxy group and the hydroxy group which is derived from the diaminoalkanol, reaction of such phosphonamidic acids with either alkylene dihalides or the diacrylates or haloalkanols results in cross-linked, rather than linear polymers. Such cross-linked polymers are highly insoluble and possess very good resistance to heat. They are thus applied as coatings in the form of hot melts, and shaped, molded pieces thereof are prepared either by conducting the polymerization reaction in the mold or by casting a melt of the polymer.

The presently provided N-(aminoalkyl)- or N-(aminohydroxyalkyl)-P-hydrocarbylphosphonamidic acids are also useful as intermediates in the production of ester amides, i.e., by reaction of the P- hydroxy and/or the alkylene hydroxy with a carboxylic acid. Such ester-amides are generally water-soluble compounds possessing surface-activity, particularly whein the carboxylic component is a higher alkanecarboxylic acid such as lauric acid. When both hydroxy groups are reacted with acetic acid, the diacetates thus obtained have sequestering effect in removal of calcium or other metal ions from aqueous solutions.

The invention is further illustrated by, but not limited to, the following examples.

Example 1

Phenylphosphonic dichloride (212 g., 1.13 moles) was added dropwise over a ninety minute period to a cooled (0° C.) mixture of 81.63 g. (less than a molar equivalent) of 1,3-propanediamine, 900 ml. of water and 88.08 g. (2.20 moles) of sodium hydroxide. The whole was then stirred for two hours at 0° C., and then extracted with chloroform. The aqueous layer which remained was evaporated to a thick gum. This was slurried with 300 ml. of ethanol and the white, solid N-(3-aminopropyl)-P-phenylphosphonamidic acid, $$C_6H_5P(O)(OH)NH(CH_2)_3NH_2$$

was filtered off. It was recrystallized by dissolving in water and precipitating slowly from dioxane. After washing the precipitated needles with dioxane and then ether, and drying under water pump vacuum there was obtained the substantially pure product, melting with decomposition at about 250° C. and analyzing as follows:

| Percent | Found | Calcd. for $C_9H_{15}N_2O_2P$ |
|---|---|---|
| C | 50.44 | 50.46 |
| H | 6.94 | 7.06 |
| N | 12.14 | 13.08 |
| P | 13.02 | 14.46 |

The N-(3-aminopropyl)-P-phenylphosphonamidic acid is soluble in water and chloroform at room temperature and insoluble in ethanol. Nuclear magnetic resonance analysis (in water) showed a single peak for $P^{31}$ at —18.2 p.p.m.

Example 2

To a cooled (—4° C. to 0° C.) mixture consisting of 24.36 g. of sodium hydroxide, 33 g. of 1,3-diamino-2-propanol and 300 ml. of water there was added dropwise 71.6 g. of phenylphosphonic dichloride which had been diluted to 400 ml. with chloroform. The whole was stirred for two hours while cooling at about the same temperature, and then allowed to stratify. The chloroform layer was removed, and the aqueous layer was allowed to stand overnight. At the end of this time, the crude N - (3-amino-2-hydroxypropyl)-P-phenylphosphonamidic acid, $C_6H_5P(O)(OH)NHCH_2CH(OH)CH_2NH_2$ precipitated out of the aqueous layer. It was recrystallized by dissolving in water and precipitating from acetone to give the substantially pure compound, M.P. 204–7° C. and analyzing 12.06% nitrogen and 12.90% phosphorus as against 12.17% and 13.45% the respective calculated values for $C_9H_{15}N_2O_3P$.

Nuclear magnetic resonance analysis in water showed a single peak for $P^{31}$ at —18.5 p.p.m., which is characteristic of the phosphonamidic acid structure.

The present invention is not to be considered as limited by any of the examples described herein, which are given by way of illustration only. It will be obvious to those skilled in the art that many modifications can be made within the spirit of the invention, which is limited only by the terms of the appended claims.

What I claim is:

1. The compound of the formula

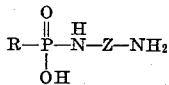

where R is an aryl radical which is free of olefinic and acetylenic unsaturation and contains from 6 to 12 carbon atoms and Z is selected from the class consisting of alkylene and hydroxyalkylene having a total of 2 to 10 carbon atoms, the nitrogen atoms being separated by a chain of 2 to 6 carbon atoms.

2. The compound of the formula

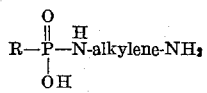

where R is an aryl radical which is free of olefinic and acetylenic unsaturation and contains from 6 to 12 carbon atoms and the alkylene radical has a total of 2 to 10 carbon atoms, the nitrogen atoms being separated by a chain of 2 to 6 carbon atoms.

3. The compound of the formula

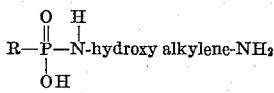

where R is an aryl radical which is free of olefinic and acetylenic unsaturation and contains from 6 to 12 carbon atoms, and the hydroxy alkylene radical has a total of 2 to 10 carbon atoms, the nitrogen atoms being separated by a chain of 2 to 6 carbon atoms.

4. N-(3-aminopropyl)-P-phenylphosphonamidic acid.

5. N - (3-amino-2-hydroxypropyl)-P-phenylphosphonamidic acid.

6. The method which comprises contacting, in the presence of an aqueous basic agent, a dihalide of the formula

where R is an aryl radical which is free of olefinic and acetylenic unsaturation and contains from 6 to 12 carbon atoms and X is halogen having an atomic weight of at least 35 with a diamine of the formula $H_2N$—Z—$NH_2$ where Z is selected from the class consisting of alkylene and hydroxyalkylene having a total of 2 to 10 carbon atoms, the nitrogen atoms being separated by a chain of 2 to 6 carbon atoms, and recovering from the resulting product the compound of the formula

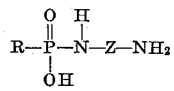

where R and Z are as above defined.

7. The method which comprises contacting, in the presence of an aqueous, water-soluble inorganic base, a dihalide of the formula

where R is an aryl radical which is free of olefinic and acetylenic unsaturation and contains from 6 to 12 carbon atoms and X is halogen having an atomic weight of at least 35 with a diamine of the formula $$H_2N\text{-alkylene-}NH_2$$

where the alkylene radical has a total of 2 to 10 carbon atoms, the nitrogen atoms being separated by a chain of 2 to 6 carbon atoms, and recovering from the resulting reaction product the compound of the formula

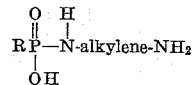

wherein R is as defined above.

8. The method which comprises contacting, in the presence of an aqueous, water-soluble inorganic base, a dihalide of the formula

where R is an aryl radical which is free of olefinic and acetylenic unsaturation and contains from 6 to 12 carbon atoms and X is halogen having an atomic weight of at least 35 with a diamine of the formula $$H_2N\text{-hydroxy alkylene-}NH_2$$

wherein the hydroxy alkylene radical has a total of 2 to 10 carbon atoms, the nitrogen atoms being separated by a chain of 2 to 6 carbon atoms, and recovering from the resulting reaction product the compound of the formula $$R-\underset{\underset{OH}{|}}{\overset{\overset{O}{\|}}{P}}-\underset{|}{\overset{N}{}}\text{-hydroxy alkylene-}NH_2$$

where R is as above defined.

9. The method which comprises contacting phenylphosphonic dichloride with 1,3-propanediamine in the presence of aqueous alkali metal hydroxide and recovering N-(3-aminopropyl)-P-phenylphosphonamidic acid from the resulting reaction product.

10. The method which comprises contacting phenylphosphonic dichloride with 1,3-diamino-2-propanol in the presence of aqueous alkali metal hydroxide and recovering N-(3-amino-2-hydroxypropyl)-P-phenylphosphonamidic acid from the resulting reaction product.

No references cited.

LEON ZITVER, *Primary Examiner.*

J. E. EVANS, *Assistant Examiner.*